United States Patent
Madasamy et al.

(10) Patent No.: US 7,338,070 B2
(45) Date of Patent: Mar. 4, 2008

(54) MULTI-CHAMBERED AIR BAG FOR A MOTOR VEHICLE

(75) Inventors: Chelliah Madasamy, Canton, MI (US); Jamel Belwafa, Ann Arbor, MI (US); Karen Balavich, Lake Orion, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 417 days.

(21) Appl. No.: 10/906,946

(22) Filed: Mar. 14, 2005

(65) Prior Publication Data

US 2006/0202450 A1    Sep. 14, 2006

(51) Int. Cl.
*B60R 21/16* (2006.01)
(52) U.S. Cl. .................................... 280/730.2
(58) Field of Classification Search ............. 280/730.2, 280/730.1
See application file for complete search history.

(56) References Cited

U.S. PATENT DOCUMENTS

| | | | |
|---|---|---|---|
| 5,447,326 A * | 9/1995 | Laske et al. | 280/728.3 |
| 5,586,782 A | 12/1996 | Zimmerman, II et al. | |
| 5,722,685 A * | 3/1998 | Eyrainer | 280/730.2 |
| 5,730,464 A * | 3/1998 | Hill | 280/743.2 |
| 5,791,685 A | 8/1998 | Lachat et al. | |
| 5,853,191 A | 12/1998 | Lachat | |
| 5,895,070 A | 4/1999 | Lachat | |
| 5,927,748 A | 7/1999 | O Driscoll | |
| 6,065,772 A | 5/2000 | Yamamoto et al. | |
| 6,158,767 A | 12/2000 | Sinnhuber | |
| 6,349,964 B1 | 2/2002 | Acker et al. | |
| 6,616,177 B2 | 9/2003 | Thomas et al. | |
| 6,802,529 B2 * | 10/2004 | Takedomi et al. | 280/729 |
| 7,021,652 B2 * | 4/2006 | Kumagai et al. | 280/729 |
| 7,093,851 B2 * | 8/2006 | Lotspih | 280/730.2 |
| 2003/0168836 A1 | 9/2003 | Sato et al. | |
| 2003/0178831 A1 | 9/2003 | Roberts et al. | |
| 2004/0124615 A1 | 7/2004 | Tanase et al. | |
| 2004/0232666 A1 * | 11/2004 | Sato et al. | 280/730.2 |
| 2005/0023808 A1 * | 2/2005 | Sato et al. | 280/730.2 |
| 2005/0104342 A1 * | 5/2005 | Jackson et al. | 280/730.2 |
| 2006/0001244 A1 * | 1/2006 | Taguchi et al. | 280/729 |
| 2006/0103120 A1 * | 5/2006 | Kurimoto et al. | 280/730.2 |
| 2006/0175809 A1 * | 8/2006 | Yamaji et al. | 280/729 |

* cited by examiner

*Primary Examiner*—Faye M. Fleming
(74) *Attorney, Agent, or Firm*—Frank A. MacKenzie; Brooks Kushman P.C.

(57) ABSTRACT

An air bag for a motor vehicle. The air bag includes a rear chamber, a front chamber disposed adjacent to and having a lower pressure than the rear chamber, and a separator disposed between the front and rear chambers that is adapted to communicate an inflation gas from the rear chamber to the front chamber. A seat occupant contacts the rear chamber before contacting the front chamber when a vehicle seat is displaced by a vehicle impact event.

20 Claims, 4 Drawing Sheets

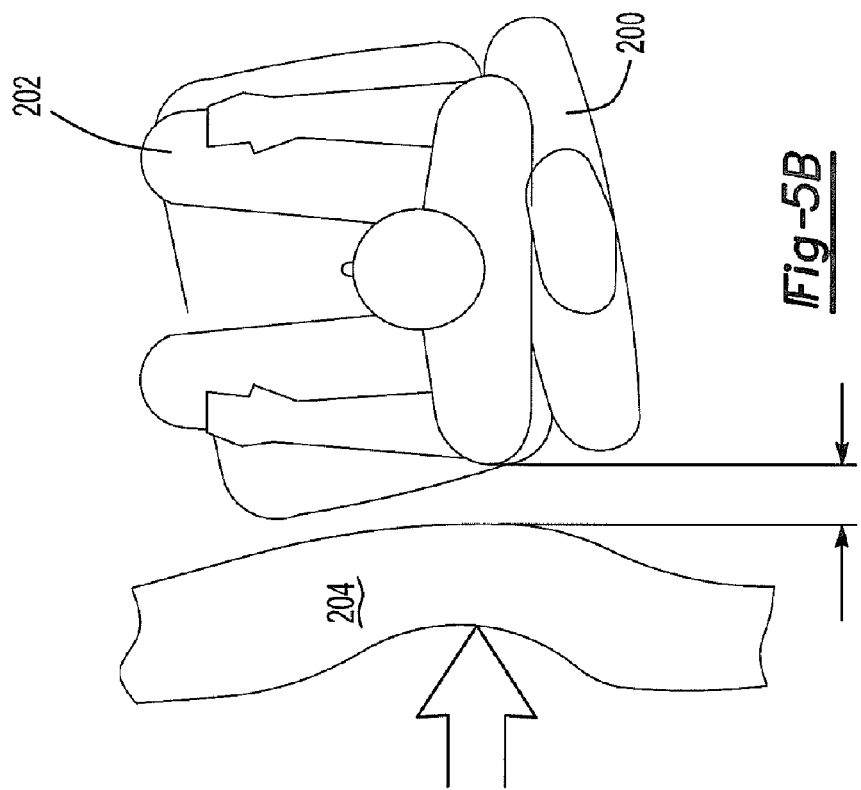
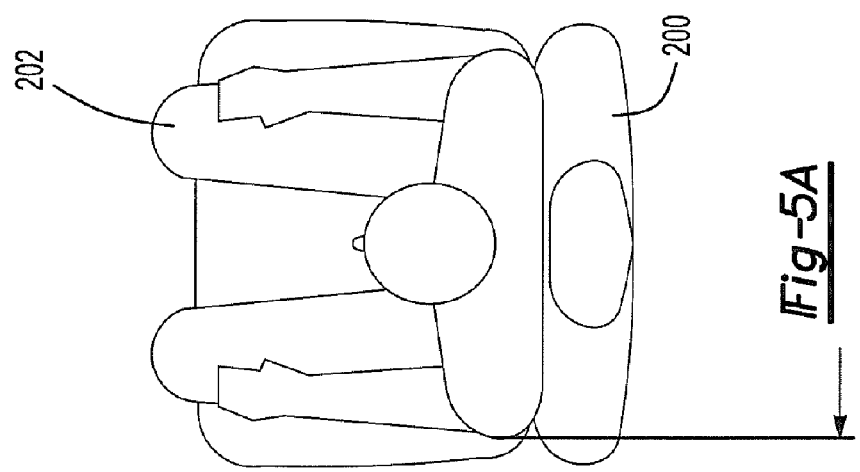
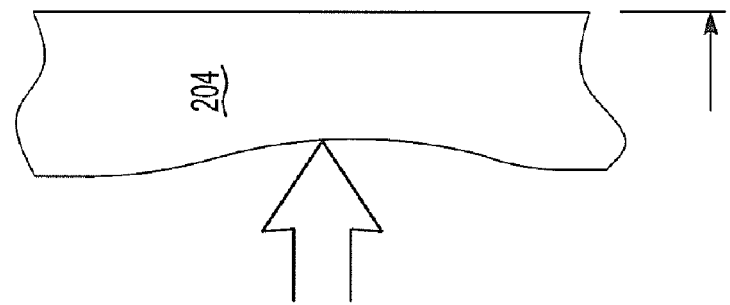

MULTI-CHAMBERED AIR BAG FOR A MOTOR VEHICLE

BACKGROUND OF THE INVENTION

1. Field of the Invention

The present invention relates to an air bag for a motor vehicle, and more particularly to a multi-chambered side impact air bag that is deployed in response to a vehicle impact event.

2. Background Art

Multi-chambered air bags are known in the vehicle air bag art, such as that disclosed in U.S. patent application Ser. No. 10/382,642. In FIG. 35 of the application referenced above, an air bag is shown having first and second chambers. The first chamber is disposed behind the shoulder of a seat occupant and the second chamber is disposed in front of and below the first chamber. Gas is supplied to the first and second chambers through first and second small holes of different total opening areas at different flow rates. Due to the difference of the gas flow rates, the first and second chambers are inflated such that the internal pressure of the first chamber is lower than the internal pressure than the second chamber.

Applicant of the present invention has discovered that inflating a first or rearward chamber of a side air bag to a lower pressure than an adjacent front chamber is not desirable. More specifically, such air bag configurations do not provide adequate occupant protection when a vehicle seat moves to a different position, such as when the floor panel or seat of a vehicle is deformed by the impact event. In such situations, the seat occupant may not move in unison with the seat. As a result, the occupant will benefit from higher rear air bag pressures that help separate the occupant from interior vehicle surfaces.

Before Applicant's invention, there was a need for an improved side impact air bag for a motor vehicle. In addition, there was a need for a side impact air bag that addresses the dynamics of vehicle components, such as the translation of a seat, in relation to a seat occupant. In addition, there was a need for an air bag that helps move the seat occupant with the vehicle seat, yet provides different levels of support or cushioning to reduce shoulder, abdominal, and thoracic rib displacements of a seat occupant to reduce the likelihood of injury. Problems associated with the prior art as noted above and other problems are addressed by Applicant's invention as summarized below.

SUMMARY OF THE INVENTION

According to one aspect of the present invention, an air bag for a motor vehicle is provided. The air bag has a deflated condition in which the air bag is located within an interior vehicle surface and an inflated condition triggered by a vehicle impact event in which the air bag is located between a seat occupant and the interior vehicle surface. The air bag includes a rear chamber, a front chamber, and a separator. The rear chamber has an inlet for receiving an inflation gas from an inflation gas source. The front chamber is disposed adjacent to and is in fluid communication with the rear chamber. The separator is disposed between the front and rear chambers and is adapted to communicate the inflation gas from the rear chamber to the front chamber. When the air bag is in the inflated condition, the seat occupant initially contacts the rear chamber and then contacts the front chamber when a vehicle seat is displaced by the vehicle impact event. As a result, shoulder, abdominal, and thoracic rib displacements of a seat occupant and the likelihood of injury is reduced.

The rear chamber may have a higher pressure than the front chamber when the air bag is in the inflated condition. The higher pressure helps move the seat occupant with the vehicle seat away from the point of impact.

The front chamber may be disposed closer to a front of the motor vehicle than the rear chamber when the air bag is in the inflated condition. The front chamber provides cushioning for the vehicle occupant.

The separator may be oriented within thirty degrees of a plane parallel to a seat back of the vehicle seat when the air bag is in the inflated condition. The separator may be aligned with a shoulder plane of the seat occupant when the air bag is in the inflated condition. Such alignment helps the occupant transition from the rear chamber to the front chamber as the seat is displaced.

The rear chamber may be wider than the front chamber when the air bag is in the inflated condition.

According to another aspect of the present invention, a side impact air bag for a motor vehicle is provided. The side impact air bag has a stored condition in which the side impact air bag is located within a vehicle seat and an inflated condition in which the side impact air bag is located between a seat occupant and an interior vehicle surface. The side impact air bag includes a rear chamber, a front chamber, and a separator. The rear chamber has an inlet for receiving an inflation gas from an inflation gas source and is disposed proximate the vehicle seat. The front chamber is disposed proximate to and is in fluid communication with the rear chamber. The separator is disposed between the front and rear chambers and is adapted to communicate the inflation gas from the rear chamber to the front chamber. The front chamber is located closer to the front of the vehicle than the rear chamber when the side impact air bag is in the inflated condition.

The front chamber may have a lower pressure than the rear chamber within 20 milliseconds after inflation gas is provided to inflate the side impact air bag.

The separator may include at least one aperture to communicate the inflation gas from the rear chamber to the front chamber. The separator may be a gas permeable membrane adapted to communicate the inflation gas from the rear chamber to the front chamber.

The separator may be aligned with a shoulder plane passing through the shoulders of the seat occupant when the side impact air bag is in the inflated condition. The separator may be oriented parallel to a seat back of the vehicle seat when the side impact air bag is in the inflated condition.

The rear chamber may move away from the seat occupant when the vehicle seat is displaced during a vehicle impact event and the front chamber may contact a shoulder of the seat occupant.

According to another aspect of the present invention, a side impact air bag for a motor vehicle is provided. The side impact air bag has a stored condition in which the side impact air bag is located within a seat back of the vehicle seat and an inflated condition in which the side impact air bag is located between a seat occupant and an interior surface of a vehicle door. The side impact air bag includes a rear chamber, a front chamber, and a separator. The rear chamber has an inlet for receiving an inflation gas from an inflation gas source and is disposed proximate the seat back. The front chamber is disposed proximate to and is in fluid communication with the rear chamber. The separator is disposed between the front and rear chambers and is adapted to communicate the inflation gas from the rear chamber to the front chamber. The rear chamber is inflated to a greater pressure than the front chamber in response to a vehicle impact event and the rear chamber moves away from the seat occupant to permit the front chamber to contact the seat occupant when the vehicle seat is displaced during the vehicle impact event.

The front chamber may have a greater volume or a lesser volume than the rear chamber.

BRIEF DESCRIPTION OF THE DRAWINGS

FIGS. 5A-5B are top views of a portion of the vehicle during an impact event without an air bag in accordance with the present invention.

DETAILED DESCRIPTION OF THE PREFERRED EMBODIMENT(S)

Figure 1:
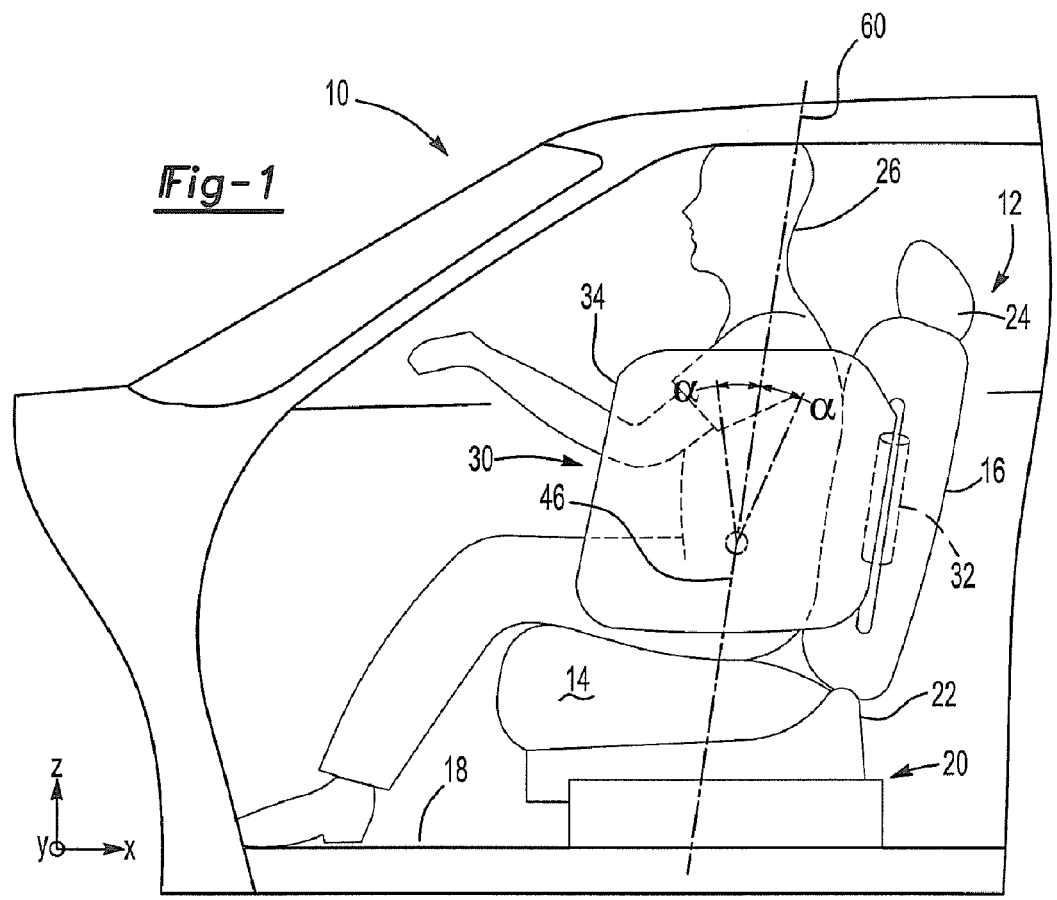
FIG. 1 is a fragmentary side view of a vehicle having an air bag in accordance with one embodiment of the present invention.

Referring to FIG. 1, a side view of a vehicle 10 is shown. The vehicle 10 includes a seat assembly 12 having a seat bottom 14 and a seat back 16.

The seat bottom 14 is attached to a vehicle floor 18 via seat adjuster mechanisms 20 that enable lateral and/or vertical movement of the seat bottom 14 with respect to the vehicle floor 18.

The seat bottom 14 and the seat back 16 are connected by pivot mechanisms 22 disposed on opposite sides of the seat assembly 12 that allow the seat back 16 to pivot with respect to the seat bottom 14.

The seat back 16 includes a headrest 24 adapted to support the head of a seat occupant 26 during a vehicle impact event. The seat back 16 may also include an air bag assembly 30.

The air bag assembly 30 includes an inflation gas source or inflator 32 and an air bag 34.

The inflator 32 is adapted to provide an inflation gas to the air bag 34. The inflator 32 may be disposed in any suitable location, such as on the seat assembly 12 or under an interior trim surface. In the embodiment shown, the inflator 32 is attached to a frame of the seat back 16.

The air bag 34 is adapted to receive inflation gas from the inflator 32 to expand from a stored condition to an inflated condition. More specifically, the air bag 34 is deflated and stored under an interior vehicle surface when it is in the stored condition and is inflated to be positioned between the seat occupant 26 and an interior vehicle surface when in the inflated condition. In the embodiment shown in FIG. 1, the air bag 34 is configured to be stored under a surface of the seat back 16 and expand through a deployment opening 36 when inflated. Alternatively, the air bag 34 may be stored under another interior vehicle surface, such as in seat bottom 14 or a trim panel.

Figure 2:
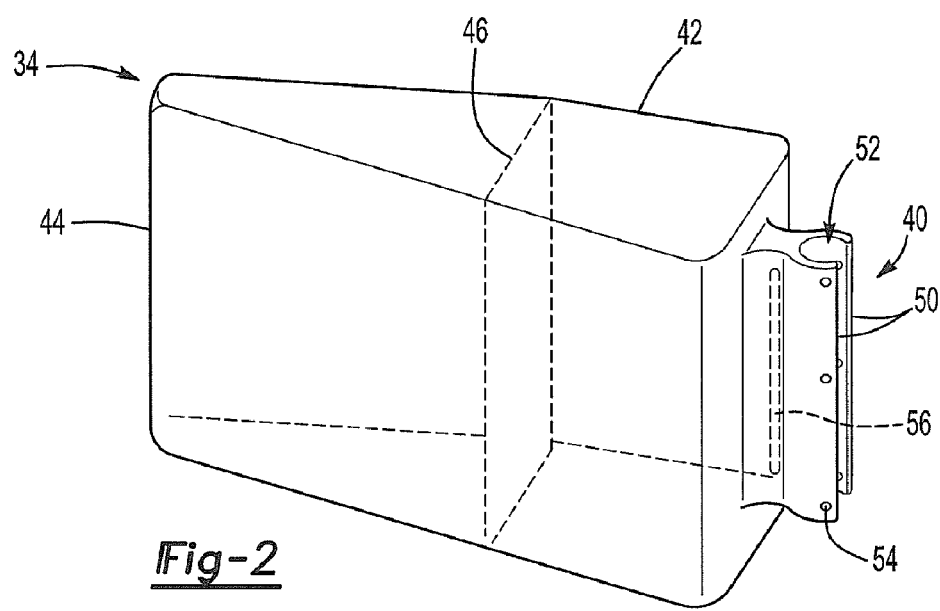
FIG. 2 is a perspective view of one embodiment of the air bag.

Referring to FIG. 2, one embodiment of the air bag 34 is shown in more detail. The air bag 34 includes an attachment feature 40, a rear chamber 42, a front chamber 44, and a tether or separator 46. The air bag 34 may be made of any suitable material and may be assembled in any suitable manner, such as by stitching, bonding, or with an adhesive.

The attachment feature 40 may have any suitable configuration. In the embodiment shown, the attachment feature 40 includes a plurality of flaps 50 that define a pocket 52 that is adapted to receive the inflator 32. The flaps 50 are configured to wrap around the inflator 32 and include a plurality of apertures 54 that are adapted to fit over attachment studs extending from the inflator 32 to secure the air bag 34 to the inflator 32.

An inlet 56 is disposed proximate the attachment feature 40 and the rear chamber 42. The inlet 56 is adapted to permit inflation gas to flow from the inflator 32 to the rear chamber 42.

The rear chamber 42 is defined by a plurality of surfaces of the air bag 34 and the separator 46. Upon deployment, the rear chamber 42 is configured to be disposed proximate the seatback 16 and between an interior vehicle surface and the seat occupant 26.

The front chamber 44 is disposed adjacent to the rear chamber 42 and is defined by a plurality of surfaces of the air bag 34 and the separator 46. More specifically, the front chamber 44 is separated from the rear chamber 42 by the separator 46.

The separator 46 is attached to opposing interior surfaces of the air bag 34 to control the shape of the air bag 34 upon deployment. The separator 46 is also adapted to permit inflation gas to flow from the rear chamber 42 to the front chamber 44 to facilitate inflation of the front chamber 44. In the embodiment shown in FIG. 2 at least a portion of the separator 46 is made of a gas permeable material that permits a limited amount of inflation gas to leak from the rear chamber 42 to the front chamber 44.

Figure 3:
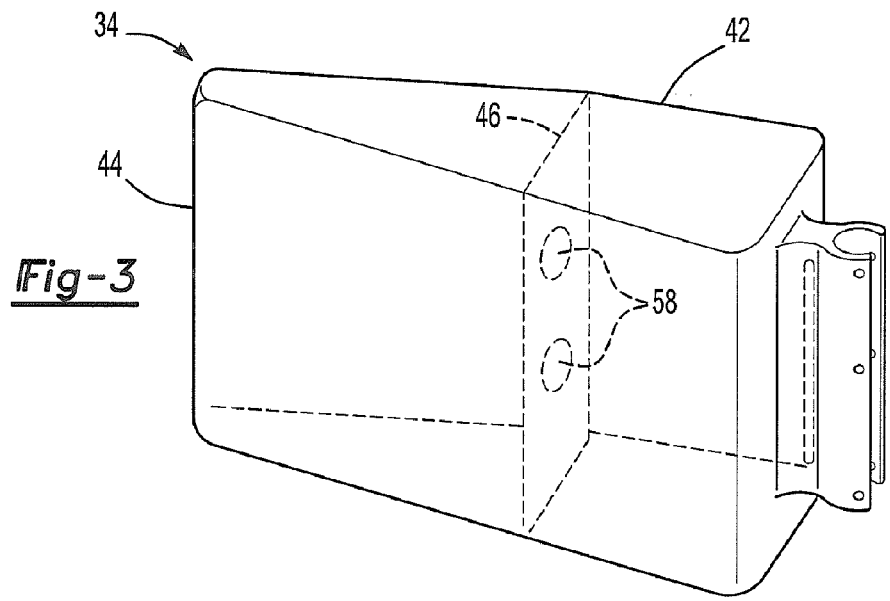
FIG. 3 is a perspective view of another embodiment of the air bag.

In an alternate embodiment, the separator 44 includes one or more apertures 58 that facilitate and limit the flow of gas between the rear and front chambers 42,44 as shown in FIG. 3.

The separator 46 may be positioned such that it has a similar orientation as a line or plane passing through the shoulders of the seat occupant 26. In the embodiment shown in FIG. 1, the separator is oriented parallel to the shoulder center line or shoulder plane 60 of the seat occupant 26. The shoulder center line is defined by a line passing through the shoulders of the seat occupant 26 and may be centered about the shoulder joints. Similarly, a shoulder plane is defined by a plane passing through the shoulders of the seat occupant 26. In the embodiment shown in FIG. 1, the separator 46 has a generally planar configuration and is oriented at approximately fifteen degrees from vertical and is oriented along a left-to-right axis, designated for convenience the Y-axis of the vehicle 10.

Alternately, the separator 46 may be positioned at an angle relative to the shoulder center line or shoulder plane. For instance, the separator 46 or a portion of the separator positioned above the center of the air bag 34 may be positioned at an angle a of plus or minus 15° from the shoulder center line to sufficiently accommodate the body position of most occupants. Positioning the separator in any aforementioned manner improves occupant protection as will be described in greater detail below.

In the embodiments shown in FIGS. 2 and 3, the rear chamber 42 receives inflation gas before the front chamber 44. Moreover, the rear chamber 42 is inflated to a greater pressure than the front chamber 44 for a period of time shortly after inflation of the air bag 34. For example, the rear chamber 42 may have a pressure of approximately 20 psi and the front chamber 44 may have a pressure of approximately 10 psi. These pressures may be attained within approximately 20 milliseconds after the inflation gas is released.

The air bag 34 may have any suitable configuration that facilitates deployment without being blocked by interior features, such as an armrest of the door. As such, the rear chamber 42 may have a greater volume or a lesser volume than the front chamber 44 depending on interior surface geometries and development testing.

Referring to FIGS. 4A-4J, various embodiments of air bag configurations are shown. These exemplary embodiments depict various relationships between first and second air bag walls, shown on the left and right sides, respectively. This invention also contemplates mirror images of the embodiments shown. In each embodiment, the separator is represented by the dashed line.

Figures 4A, 4B, 4C, 4D, 4E:
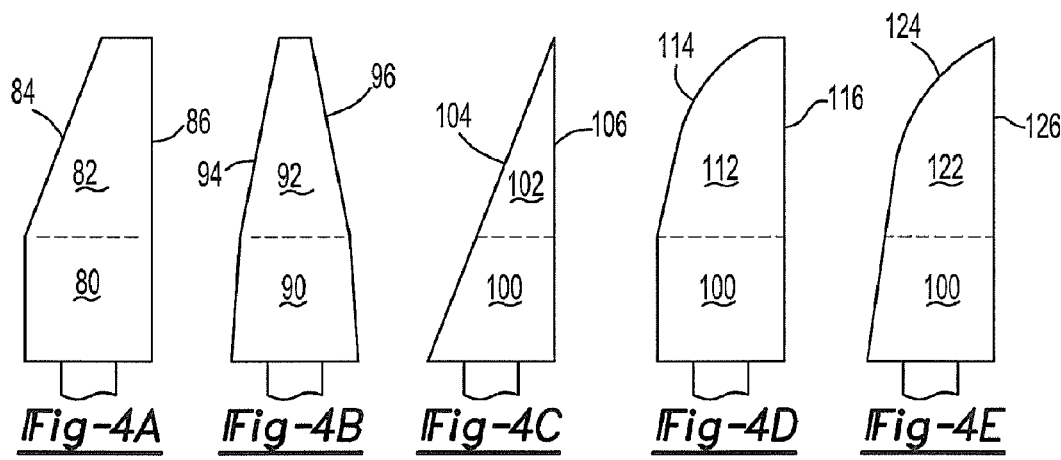
FIGS. 4A-4J are plan views of various air bag geometries.

In FIG. 4A, the rear chamber 80 has a generally rectangular shape and the front chamber 82 has a first wall 84 angled with respect to the second wall 86.

In FIG. 4B, the rear chamber 90 and front chamber 92 have a trapezoidal shape where the first and second walls 94,96 are oriented at different angles relative to the separator for the rear and front chambers 90,92.

Referring to FIG. 4C, the air bag has a triangular shape such rear chamber 100 is trapezoidal, the front chamber is triangular 102, the first wall 104 is angled with respect to the second wall 106, and the second wall is perpendicular to the separator.

Referring to FIG. 4D, the rear chamber 110 has a generally rectangular shape and the front chamber 112 has a curved first wall 114 and a linear second wall 116.

Referring to FIG. 4E, the rear and front chambers 120,122 have a curved first wall 124 and a linear second wall 126.

Figures 4F, 4G, 4H, 4I, 4J:
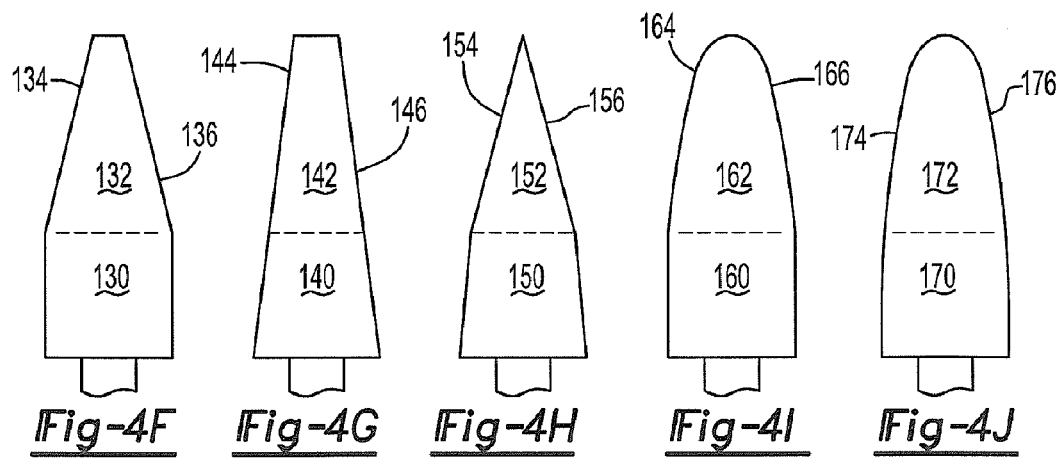

Referring to FIG. 4F, the rear chamber 130 has a rectangular shape and the front chamber 132 has a trapezoidal shape with angled first and second walls 134,136.

Referring to FIG. 4G, the air bag has a trapezoidal shape such that the rear and front chambers 140,142 have linear first and second walls 144,146 sloped at an angle relative to the separator.

Referring to FIG. 4H, the air bag has an isosceles triangular shape such that the rear and front chambers 150,152 have linear first and second walls 154,156 sloped at the same angle relative to the separator.

Referring to FIG. 4I, the rear chamber 160 has a rectangular shape and the front chamber 162 has curved first and second walls 164,166.

Referring to FIG. 4J, the rear and front chambers 170,172 have curved first and second walls 174,176.

The embodiments of the present invention described above reduce the likelihood of injury during a vehicle impact event. Referring to FIGS. 5A-5B, a vehicle that does not employ an air bag in accordance with the present invention is shown. For clarity, no air bag is shown in these figures. However, these figures are representative of vehicle dynamics when a conventional side impact air bag having a single chamber or horizontally separated chambers is employed.

In FIG. 5A, the initial stages of a side impact event is shown. The direction of impact is represented by the large arrow. Initially, the seat 200 and seat occupant 202 are in an initial position in which they are not affected by the side impact event. If the impact forces are of a sufficient magnitude, then a portion of a vehicle such as a side panel or vehicle door 204 is deformed.

If the structure supporting the seat is sufficiently deformed, the seat 200 moves from the initial position shown in FIG. 5A to a second position, such as that shown in FIG. 5B. For instance, if the floor structure is deformed, the seat will translate to a different location. In the exemplary scenario shown in FIG. 5B, the seat rotates and moves away from the point of impact.

If the seat 200 translates to a different position, the seat occupant 202 may not translate at the same time, rate, or distance as the seat 200, thereby leaving the seat occupant 202 in substantially the same position shortly after the impact event. Moreover, a conventional three-point seat belt that is attached to a B-pillar of the vehicle is not designed to move a seat occupant along the Y-axis during a direct side impact event. In such a situation, the distance between the seat occupant 202 and an interior vehicle surface will decrease, as shown by the short double arrowed line in FIG. 5B. This decreased distance increases the likelihood of contact between the seat occupant and an internal vehicle surface, thereby increasing the likelihood of injury.

Figure 6B:
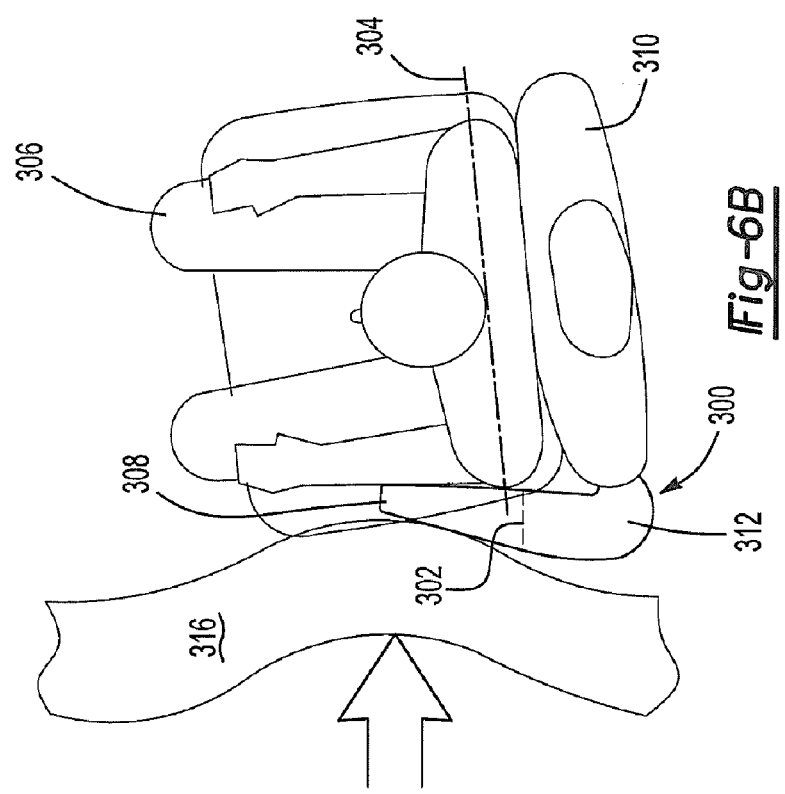
FIGS. 6A-6B are top views of a portion of the vehicle during an impact event with an air bag in accordance with the present invention.
Figure 6A:
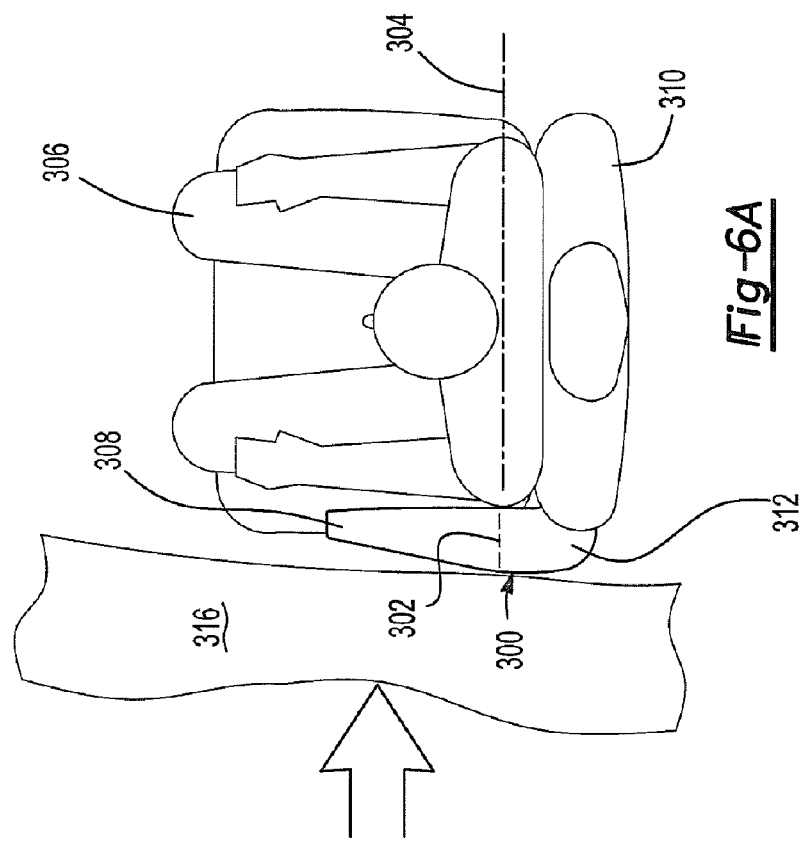

Referring to FIGS. 6A-6B, a vehicle employing the air bag of the present invention is shown. In FIG. 6A, the large arrow represents a side impact event like that shown in FIG. 5A. In response to the side impact event, the air bag 300 is deployed. Initially, the air bag 300 is positioned such that the separator 302 is approximately aligned with the shoulder center line 304 of the seat occupant 306 such that the front chamber 308 of the air bag 300 is positioned in front of the shoulder center line 304.

As the impact event proceeds, the seat 310 translates to a second position as shown in FIG. 6B. As a result, the rear chamber 312 of the air bag 300 contacts the shoulder of the occupant 306 until the seat moves. The high pressure of the rear chamber 314 helps move the occupant 306 away from an interior vehicle surface 316, such as a door or trim panel, in the direction of seat movement. If the occupant 306 does not move in unison with the seat, the occupant 306 then slides into contact with the front chamber 308. The lower pressure of the front chamber 308 helps provide cushioning while maintaining spacing between the occupant 306 and the interior vehicle surface 316.

The air bag of the present invention reduces shoulder, thoracic, and abdominal rib displacements of a seat occupant. For example, in evaluations performed in accordance with the 40 mph side impact test proposed by the Insurance Institute of Highway Safety, shoulder, thoracic, and abdominal rib displacements were substantially reduced as shown in the table below.

| Location | Maximum Deflection - No Air Bag (mm) | Maximum Deflection - Present Invention (mm) | Improvement (mm) |
|---|---|---|---|
| Shoulder | 42 | 36 | 6 |
| Upper Thoracic Rib | 60 | 52 | 8 |
| Middle Thoracic Rib | 50 | 38 | 12 |
| Lower Thoracic Rib | 48 | 34 | 14 |
| Upper Abdominal | 38 | 14 | 28 |
| Lower Abdominal | 45 | 15 | 30 |

The data presented above is based on side impact analytical simulations of a vehicle using a SID2S crash test dummy. As shown in the table above, occupant displacement is reduced in all regions. In addition, the present invention provides faster response to an impact event. More specifically, the maximum values in tests utilizing the present invention were detected between 10 and 15 milliseconds earlier than the maximum values when no airbag was employed. The earlier maximum values indicate that the present invention helps move an occupant away from the point of impact faster than without an air bag and with a decreased likelihood of injury.

While the best mode for carrying out the invention has been described in detail, those familiar with the art to which this invention relates will recognize various alternative designs and embodiments for practicing the invention as defined by the following claims.

What is claimed is:

1. An air bag for a motor vehicle, the air bag having a deflated condition in which the air bag is located within an interior vehicle surface and an inflated condition triggered by a vehicle impact event in which the air bag is located between a seat occupant and the interior vehicle surface, the air bag comprising:
   a rear chamber having an inlet for receiving an inflation gas from an inflation gas source;
   a front chamber disposed adjacent to and in fluid communication with the rear chamber; and
   a separator disposed between the front and rear chambers, the separator adapted to communicate the inflation gas from the rear chamber to the front chamber;
   wherein when the air bag is in the inflated condition, the seat occupant initially contacts the rear chamber and then contacts the front chamber when a vehicle seat is displaced by the vehicle impact event.

2. The air bag of claim 1 wherein the rear chamber has a higher pressure than the front chamber when the air bag is in the inflated condition.

3. The air bag of claim 1 wherein the front chamber is disposed closer to a front of the motor vehicle than the rear chamber when the air bag is in the inflated condition.

4. The air bag of claim 1 wherein the separator is oriented within thirty degrees of a plane parallel to a seat back of the vehicle seat when the air bag is in the inflated condition.

5. The air bag of claim 1 wherein the separator is aligned with a shoulder plane of the seat occupant when the air bag is in the inflated condition.

6. The air bag of claim 1 wherein the rear chamber is wider than the front chamber when the air bag is in the inflated condition.

7. A side impact air bag for a motor vehicle, the side impact air bag having a stored condition in which the side impact air bag is located within a vehicle seat and an inflated condition in which the side impact air bag is located between a seat occupant and an interior vehicle surface, the side impact air bag comprising:
   a rear chamber having an inlet for receiving an inflation gas from an inflation gas source, the rear chamber being disposed proximate the vehicle seat;
   a front chamber disposed proximate to and in fluid communication with the rear chamber; and
   a separator disposed between the front and rear chambers, the separator adapted to communicate the inflation gas from the rear chamber to the front chamber;
   wherein the front chamber is located closer to the front of the vehicle than the rear chamber when the side impact air bag is in the inflated condition.

8. The side impact air bag of claim 7 wherein the front chamber has a lower pressure than the rear chamber within 20 milliseconds after the inflation gas is provided to inflate the side impact air bag.

9. The side impact air bag of claim 7 wherein the separator includes at least one aperture to communicate the inflation gas from the rear chamber to the front chamber.

10. The side impact air bag of claim 7 wherein the separator is a gas permeable membrane adapted to communicate the inflation gas from the rear chamber to the front chamber.

11. The side impact air bag of claim 7 wherein the separator is aligned with a shoulder plane passing through a center line of both shoulders of the seat occupant when the side impact air bag is in the inflated condition.

12. The side impact air bag of claim 7 wherein the separator is oriented parallel to a seat back of the vehicle seat when the side impact air bag is in the inflated condition.

13. The side impact air bag of claim 7 wherein the separator is oriented within fifteen degrees of a plane disposed parallel to a seat back of the vehicle seat when the side impact air bag is in the inflated condition.

14. The side impact air bag of claim 7 wherein the rear chamber moves away from the seat occupant when the vehicle seat is displaced during a vehicle impact event.

15. The side impact air bag of claim 7 wherein when the vehicle seat is displaced during a vehicle impact event the rear chamber moves away from the seat occupant and the front chamber contacts a shoulder of the seat occupant.

16. A side impact air bag for a motor vehicle, the side impact air bag having a stored condition in which the side impact air bag is located within a seat back of a vehicle seat and an inflated condition in which the side impact air bag is located between a seat occupant and an interior surface of a vehicle door, the side impact air bag comprising:
   a rear chamber having an inlet for receiving an inflation gas from an inflation gas source, the rear chamber being disposed proximate the seat back;
   a front chamber disposed proximate to and in fluid communication with the rear chamber; and
   a separator disposed between the front and rear chambers, the separator adapted to communicate the inflation gas from the rear chamber to the front chamber;
   wherein the rear chamber is inflated to a greater pressure than the front chamber in response to a vehicle impact event and the rear chamber moves away from the seat occupant to permit the front chamber to contact the seat occupant when the vehicle seat is displaced during the vehicle impact event.

17. The side impact air bag of claim 16 wherein the front chamber is located closer to the front of the vehicle than the rear chamber when the side impact air bag is in the inflated condition.

18. The side impact air bag of claim 16 wherein the separator has a generally vertical orientation when the side impact air bag is in the inflated condition.

19. The side impact air bag of claim 16 wherein the front chamber has a greater volume than the rear chamber.

20. The side impact air bag of claim 16 wherein the rear chamber has a greater volume than the front chamber.

* * * * *